March 16, 1943.   H. J. CARLIN ET AL   2,313,921
REGULATOR CONTROL EQUIPMENT
Filed Jan. 9, 1942
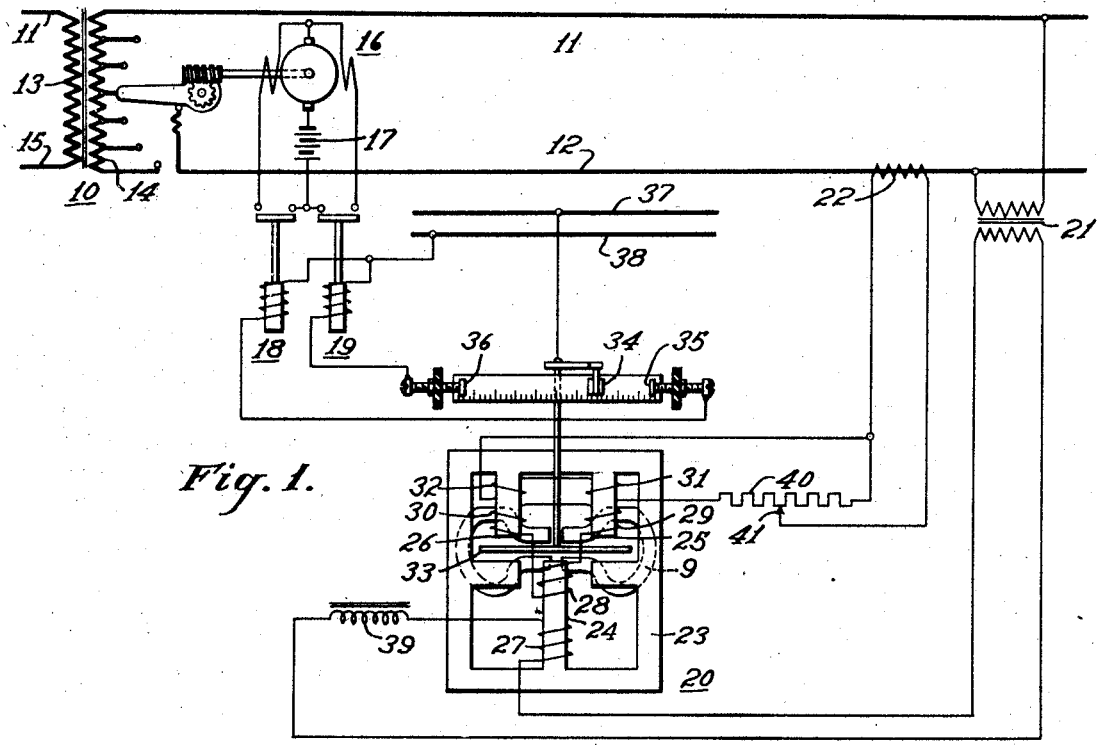
Fig. 1.
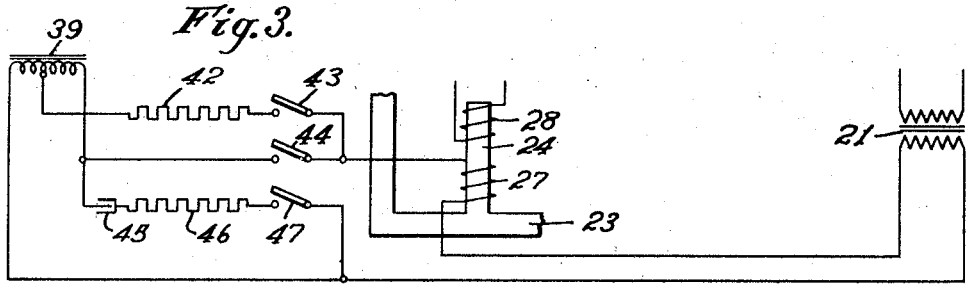
Fig. 3.
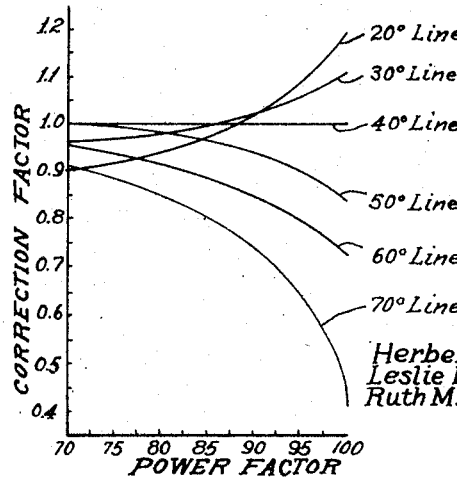
Fig. 2.
Fig. 4.
WITNESSES:
Edward Michaels
Wm. C. Groome
INVENTORS
Herbert J. Carlin and
Leslie N. Crichton, deceased, by
Ruth M. Crichton, Administratrix.
BY
James N. Ely
ATTORNEY Patented Mar. 16, 1943

2,313,921

UNITED STATES PATENT OFFICE 2,313,921

REGULATOR CONTROL EQUIPMENT

Herbert J. Carlin, East Orange, and Leslie N. Crichton, deceased, late of Livingston, N. J., by Ruth M. Crichton, administratrix, Livingston, N. J., assignors to Westinghouse Electric & Manufacturing Company, East Pittsburgh, Pa., a corporation of Pennsylvania Application January 9, 1942, Serial No. 426,259

5 Claims. (Cl. 171—119)

This invention relates to regulator systems and particularly to apparatus for regulating the voltage of alternating current circuits.

In regulating systems, particularly in rural districts having low capacity feeders, where tap-changing voltage regulators are employed to maintain normal voltage during the heavy load periods, frequent operation of the contact-making taps of the regulator produces excessive contact wear. Time delay is, therefore, usually provided in the tap-changer control circuit.

The time delay introduced in the control circuit of the tap-changing transformer type of regulator makes it essential that a definite time must elapse before the regulator is actuated. In practice such definite time delay, usually between 10 seconds and 1 minute, necessitates extra equipment and expense while reducing the effectiveness of the regulator for whether the voltage change encountered is a gradual change in small increments or a sudden change in large increments, the time delay is the same.

A voltmeter relay of the induction type and often used in protective relay circuits, has an inverse time delay characteristic because of the presence of a permanent magnet therein. The use of such a voltmeter type of relay with a regulating device gives a sensitive operation of that regulating device insofar as time delay is concerned without a large number of unnecessary operations.

In practice, it is of course desirable that the voltmeter type of relay employed as the control apparatus of the regulator, be not susceptible to changes in temperature particularly in outdoor installations where the ambient temperature varies over a wide range. Further, line drop compensation must also be employed in order to obtain correct operation of the regulator.

The use of the known line drop compensators involves a variable resistance and a reactance connected in series with the primary winding of the voltmeter whereby the voltage drop across the compensator is proportional to the line drop and is subtracted from the voltage which is proportional to the voltage which is to be regulated to give a resultant voltage across the primary winding of the voltmeter which simulates the voltage at the load center. Such compensators introduce additional complications in the regulating system.

It is an object of this invention to provide a regulating system which is substantially unaffected by changes in ambient temperature and which is provided with line drop compensation and inverse time delay.

Another object of this invention is to provide a voltmeter type of relay which is substantially unaffected by changes in ambient temperature and which is provided with a self-contained line drop compensator and inherent inverse time delay.

Other objects of this invention will become apparent from the following description, when taken in conjunction with the accompanying drawing, in which:

Figure 1 is a diagrammatic view of the apparatus and circuits comprising one embodiment of this invention;

Fig. 2 is a graph, curves of which illustrate the correction factor for the relay of this invention when employed with electric circuits having different power factors;

Fig. 3 is a diagrammatic view of a modification of a part of the apparatus and circuits illustrated in Fig. 1; and Fig. 4 is a simplified vector diagram of a relay of the type utilized in this invention.

Referring to Fig. 1 of the drawing, a tap changing regulator 10 is provided for regulating the voltage of the circuit comprising conductors 11 and 12. The regulator 10 comprises the primary winding 13 connected across a source of alternating current power designated by conductors 11 and 15 and the secondary winding 14, the different sections of which are disposed to be connected across the conductors 11 and 12 representative of the feeder or load circuit.

The motor 16 is provided for adjusting the electrical connection to the taps of the secondary winding 14 to control the voltage across conductors 11 and 12. When energized from a suitable source of power such as the battery 17 by the actuation of a control contactor 18, the motor operates the regulator 10 in the circuit voltage raising direction. When energized by the actuation of a control contactor 19, the motor 16 operates the regulator 10 in the opposite or circuit voltage lowering direction.

A primary relay 20 is utilized to selectively control the energization of the contactors 18 and 19. The relay 20 is disposed to be energized through the potential transformer 21 in accordance with predetermined changes in the voltage across conductors 11 and 12 and its operation is affected by the line drop as measured through the current transformer 22.

The relay 20, shown as being of the induction type, comprises a magnetizable core structure having an outer ring 23, an upwardly projecting central leg 24 and two downwardly extending spaced legs 25 and 26. Windings 27 and 28 are carried on the leg 24, the winding 28 being connected in series circuit relation with the series connected windings 29 and 30 carried on the legs 25 and 26, respectively. Auxiliary compensating windings 31 and 32 are also carried on the legs 25 and 26, respectively, and are connected in series circuit relation with each other.

As illustrated, a movable disk 33 of copper or other suitable material is rotatably mounted between the ends of the pole pieces or projecting legs of the magnetic circuit disposed to be moved in one or the other direction, dependent upon the energization of the windings of the relay. When the disk 33 is moved, a contact member 34 carried thereby is actuated to engage one or the other of stationary contact members 35 or 36 to energize the windings of one or the other of the contactors 18 or 19, depending upon the direction of movement of the contact member 34. The winding of the contactor 18 or 19 is connected across the power source represented by conductors 37 and 38 when the contact member 34 engages the stationary contact members 35 or 36, respectively, associated therewith.

The contact members 35 and 36 are adjustably mounted in order to set the relay for the voltage regulation band width required. As in usual practice a spring (not shown) is secured to the shaft of the disk 33 for determining the scale calibration of the relay 20. When the windings of the relay are deenergized, the contact member 34 is normally held in engagement with contact member 35. The strength of the spring (not shown) determines the spread of the calibration for, as is well known, if the spring tension is too strong the contact member 34 will not move except in response to very high voltage across conductors 11 and 12. As illustrated, a permanent magnet assembly 9 is provided for imparting time delay in the operation of the relay 20, the effect of the permanent magnet varying inversely as the change in the voltage so as to give a sensitive inverse time delay in the operation of the relay.

The windings 29 and 30 on the legs 25 and 26 respectively are so carefully constructed that the reactance of the circuit of these legs or poles equals their resistance to give the windings a 45° impedance angle. This is done in order to make any temperature error due to the upper legs or pole impedance a minimum, it being readily established that such temperature error is a minimum under such conditions.

Even with such adjustment of the windings 29 and 30, it is found that a change in ambient temperature also produces such variations in the relay impedance that the current in the potential circuit of the relay varies with the temperature even though the voltage remains constant. For this reason, a swamping or ballast reactor 39 is connected in series with the potential winding 27 and the transformer 21. The impedance of the reactor 39 is so large that about 80% of the voltage across the conductors 11 and 12 is used across the reactor 39. Thus the current in the winding 27 is to a large extent independent of the impedance of the relay, such impedance being small with respect to the total potential circuit impedance. With the reactor 39 connected in the circuit as described, it is found that variations in relay impedance have substantially no effect on the total impedance of the voltage circuit and the current in the relay remains substantially constant independent of temperature changes over a wide range.

In the relay illustrated, line drop compensation is applied through the auxiliary windings 31 and 32 carried by the upper poles 25 and 26, respectively. These windings when energized in conjunction with the energization of winding 27 are disposed to apply a torque to the induction disk 33 which is proportional to the line drop in opposition to the main relay torque developed on the disk 33 when only the primary winding 27 is energized.

In order that the torque developed by the auxiliary windings 31 and 32 be proportional to the line drop, a slide-wire resistor type of potentiometer 40 is so connected between the line current transformer 22 and the auxiliary windings 31 and 32 that as the slide 41 is moved, the magnitude of current in the auxiliary windings 31 and 32 varies while the phase angle of the current stays constant. Thus provision is made for obtaining an adjustment in accordance with the absolute magnitude of impedance of the electric circuit 11 and 12.

In addition to adjusting for the magnitude of impedance of the electric circuit 11 and 12, provision is made for adjusting for the phase angle of the impedance of the electric circuit. Such adjustment is obtained by the use of the reactor 39 referred to hereinbefore as compensating for temperature error which would otherwise be found in the relay. The reactor 39 when properly selected, performs the function of a phase-shifting network as well as giving an effective shift substantially equal to the impedance angle of the electric circuit 11 and 12. With the selection of the reactor 39, the phase angle adjustment is fixed and the compensated relay is theoretically adapted for only one circuit. Practically, however, as will be explained more fully hereinafter, it has been found possible to employ the compensated relay 20 in a wide range of circuits without excessive error in voltage regulation.

In operation, the regulator 10 is adjusted to maintain a given voltage across conductors 11 and 12. Under this condition, the contactors 18 and 19 are in their deenergized position and contact member 34 is maintained out of engagement with either of the contact members 35 and 36 due to the fact that a given voltage within the limits of the voltage regulation band width, is applied to the relay.

If for any reason the voltage across conductors 11 and 12 should increase, the energization of the winding 27 is increased and consequently the windings 28, 29 and 30 inductively coupled therewith are so energized as to apply a torque to the disk 33 and actuate the contact member 34 into engagement with contact member 36. When contact members 34 and 36 are in engagement, a circuit is closed extending from conductor 37 through the contact members 34 and 36, the energizing winding of contactor 19 to the conductor 38 to energize the contactor 19 and actuate its circuit closing member to a circuit closing position. Under this condition, the motor 16 is energized to actuate the tap changing regulator 10 to decrease the voltage across conductors 11 and 12.

During this operation, the reactor 39 functions to compensate for the phase angle of the electric circuit 11 and 12. At the same time, the windings 31 and 32 are energized through the resistor 40 from the current transformer 22. The energization of the auxiliary or compensating windings 31 or 32 produces a torque on the disk 33 in opposition to the torque produced by the increase in the energization of the winding 27 and the windings 28, 29 and 30 inductively coupled therewith and is proportional to the current in the electric circuit 11 and 12. The amount of compensating or auxiliary winding torque is also dependent upon the phase angle between the line current and the line voltage. Thus with the torque affecting the actuation of the disk 33 dependent upon both the voltage across conductors 11 and 12 and the load current of the electric circuit, it is readily seen that the operation of the relay 20 is such as to correct for the conditions at the load center, the reactor 39 correcting for the phase angle of the impedance of electric circuit and the resistor 40 correcting for the magnitude of that impedance. With this compensation, the disk 33 is actuated to control the operation of the regulator 10 to maintain the required voltage at the load center.

During the operation it is found that changes in the ambient temperature do not substantially affect the operation of the relay 20. This is because of the selection of the windings 29 and 30 referred to hereinbefore and the inclusion of the swamping reactor 39 in the potential circuit. The effect of the windings 29 and 30 and the reasons for so selecting them that the reactance of the circuit of the legs or poles 25 and 26 equals their resistance will be better understood by reference to Fig. 4 in which a simplified vector diagram of an induction relay is illustrated.

In the vector diagram $i_1$ is the current flowing in the primary winding 27 and $\Phi_1$ is the flux produced thereby. The secondary voltage $e_2$ across the winding 28 is illustrated as 90° behind the primary current $i_1$, with the secondary current $i_2$ flowing in the secondary circuit including windings 29 and 30 lagging the secondary voltage $e_2$ by an angle $b$ which is a function of the resistance $R_2$ and reactance $X_2$ of the secondary circuit, the flux of which is designated as $\Phi_2$. Considering that the torque of the disk may be represented by the equation $$T = K\Phi_2\Phi \sin a \quad (1)$$

then for maximum torque, $a$ should equal 90°. However $a = 90 - b$ and since $$b = \tan^{-1}\frac{R_2}{X_2}$$

then $$a = 90 - \left(\tan^{-1}\frac{R_2}{X_2}\right) \quad (2)$$

If the relay secondary windings are designed for maximum torque, that is, $a=90°$, then when $R_2$ changes due to a change in the ambient temperature, the Equation 2 shows there is no effect on the angle $a$ although the secondary current $i_2$ changes in magnitude due to the change in the resistance $R_2$. Therefore, the flux $\Phi_2$ which equals $ki_2$, also changes in magnitude and from Equation 1 it is seen that the torque must vary. In other words, with the windings designed for $a=90°$ there is a variation of relay torque with a change in ambient temperature resulting in an error.

However, if the secondary windings 29 and 30 are so selected that the angle $a$ is approximately 45°, a variation in $R_2$ also changes the value of angle $a$ (see Equation 2) which tends to compensate for any change in magnitude of the flux $\Phi_2$. Thus if the temperature increases, the resistance $R_2$ increases and the flux $\Phi_2$ decreases, the normal tendency of which is to reduce the torque. However, when the resistance $R_2$ increases, the angle $a$ also increases to tend to increase the torque, as indicated by Equation 1. The net result of such changes is that the change in the angle $a$ neutralizes the change in magnitude of the flux $\Phi_2$ and the torque remains constant, independent of a wide variation in temperature.

From the above, it is evident that the relay functions as an ammeter, that is, its operation is dependent on the flow of current and not directly on the voltage across its terminals. The inclusion of the swamping reactor 39 in the potential circuit in series with the winding 27 insures such functioning of the relay, the impedance of the reactor 39 being so large that the impedance of the relay is quite small with respect to the total primary circuit impedance and the current flowing in the circuit is, therefore, substantially independent of the impedance of the winding 27.

If for any reason the load current increases, the resultant or net torque on the disk 33 decreases even though the voltage across the conductors 11 and 12 remains unchanged. When this occurs the disk 33 is rotated to a position where the movable contact member 34 engages the contact member 35 to close a circuit to energize the winding of contactor 18. The energization of the contactor 18 actuates its contact member to its circuit closing position to energize the motor 16 to operate the regulator 10 to increase the voltage across conductors 11 and 12 to compensate for the line drop.

As explained hereinbefore, the reactor 39 is so selected that it will perform the function of a phase shifting network giving an effective shift substantially equal to the impedance angle of the electric circuit 11 and 12. Although this reactor is fixed, the relay 20 embodying such reactor can be employed with different circuits. For example, if the reactor is designed so that when placed in series with the winding 27 of the relay 20 the angle between the impressed voltage and the voltage across the relay is 40°, then the relay can be employed with any 40° electric circuit and the relay can be operated correctly for any load and any power factor providing the slide wire 44 of the load drop compensator 40 is set for the true magnitude of full load line drop.

If this 40° corrected relay is employed in conjunction with an electric circuit whose impedance angle is 70° instead of 40°, then the relay no longer gives correct voltage indications if the compensating resistor 40 is adjusted for the true magnitude of full load line drop. However, for any given power factor, a setting of the line drop compensator 40 can be found which makes the relay 20 operate correctly for any load at that particular power factor. This setting of the load drop compensator 40 can be ascertained by a compensator correction factor which is, in effect, an intentional error in the setting of the compensator 40 to correct for the error in the relay phase angle setting.

Referring to Fig. 2 of the drawing, there is shown a set of curves which illustrates how the compensator correction factor varies as a function of the load power factor when a 40° relay is used on different lines. These curves are based on a 40° relay since 40° has been found to be the average impedance angle of average low capacity lines utilized in rural districts to which this invention is particularly applicable.

As illustrated in Fig. 2, the correction factor curves show what errors may be expected in operating a relay having a reactor 39 connected in circuit therewith, the reactor being selected to give a 40° relay when such a relay is employed with electric circuits whose impedance angle is other than 40°. For example, if the 40° relay is employed with an electric circuit having an impedance angle of 60° where the power factor varies from 80 to 90%, by referring to Fig 2, it is seen that the correction factor for 80% power factor is .91 and the correction factor for 90% power factor is .85. The average correction factor is then .88 and the variation plus or minus .03. Thus if the true line drop at full load is 10 volts in terms of the transformer, 21, secondary circuit, the slide wire 41 of the compensator 40 is set at .88×10=8.8 volts. The maximum error would then be ±.03×10=±.3 volt. As is obvious, the error in such case would be very small, and it will be readily appreciated that the narrower the range of power factor the smaller would be the relay voltage errors. Such slight errors can, however, be eliminated by providing for the adjustment of the reactor 39 or by providing an adjustable phase shifter in place of the reactor 39.

Referring to Fig. 3, there is illustrated an adjustable phase shifter to be employed in place of the fixed reactor 39 of the embodiment illustrated in Fig. 1. In this embodiment, a fixed resistor 42 is disposed to be connected in series with a part of the reactor 39 and with the winding 27 when the circuit closing member 43 is actuated to its circuit closing position. A phase shifter of this type is satisfactory for use with the relay 20 where the relay is to be employed with electric circuits having an impedance angle of between 5 and 30°.

As illustrated, the reactor 39 is also disposed to be connected in circuit with the winding 27 by the circuit closing member 44 so that the fixed reactor is employed as the phase shifting member in the same manner illustrated in Fig. 1, such phase shifting member being completely satisfactory for use with electric circuits having an impedance angle of between 30° and 50°.

Where the electric circuit with which the relay is to be employed has an impedance angle of between 50 and 70°, then the combination of the reactor 39, the capacitor 45 and resistor 46 may be employed as the phase shifting network. In this embodiment, the capacitor 45 and resistor 46 are connected in series circuit relation with each other and are disposed to be connected in parallel relation with the reactor 39 when the circuit closing member 47 is actuated to its circuit closing position and the combination of the reactor 39, capacitor 45 and resistor 46 are connected to the winding 27 by the circuit closing member 44. By using similar phase shifting networks, suitably modified, the phase shift angle may be controlled to as fine a degree as may be required.

With the embodiment illustrated in Fig. 3, an adjustable phase shifter is provided which, in addition to compensating for the phase angle of the impedance of the electric circuit, also compensates for any temperature changes whereby the current in the winding 27 of the relay is substantially unaffected by any change in ambient temperature.

In the interest of maintaining the description of this invention clear and definite as to the apparatus and circuits employed, the description has not been complicated by the inclusion of the mathematical derivation of formulae for determining the required impedance of the ballast reactor, impedance of the windings of the relay, line drop compensating resistor or the correction factor referred to hereinbefore. Details of the design of the relay and the derivation of the formulae can be had by reference to the paper entitled "A New Voltage Regulating Relay Plus Line Drop Compensation" by H. J. Carlin which was presented at the January 1942 A. I. E. E. convention.

The regulator control equipment described hereinbefore can be employed satisfactorily with any type of regulator being provided with its own inherent line drop compensation and is substantially unaffected by changes in temperature. When employed in conjunction with a tap-changing transformer regulator, the regulating equipment of this invention makes such tap-changing transformer approach the effectiveness of an induction regulator. Further, the control equipment is simplified since it is only necessary to provide one adjustment for line drop compensation without introducing excessive errors in voltage when used in conjunction with regulating equipment on low capacity lines.

Although this invention has been described with reference to a particular embodiment thereof, it is, of course, not to be limited thereto except insofar as is necessitated by the appended claims.

I claim:

1. In combination, an electric circuit having a line impedance, regulator means connected to said circuit for varying an electric quantity thereof, a primary relay for controlling the regulator means, the relay comprising a magnetic core structure, a plurality of windings disposed thereon, and a disk disposed for movement when the windings are energized to produce a torque thereon for controlling the regulator means, one of the windings being supplied with electric energy at a voltage that is a measure of the voltage of the electric circuit, compensating means connected in circuit with said one of the windings for compensating for the phase angle of the impedance of the electric circuit, said compensating means maintaining the current in said one of the windings substantially constant for changes in ambient temperature, another of the windings being supplied with electric energy at a current value that is a measure of the current in the electric circuit, and compensating means connected in circuit with said another of the windings, for compensating for the magnitude of the impedance of the electric circuit independently of the phase angle of said impedance.

2. In combination, an electric circuit having a line impedance, regulator means connected to said circuit for varying an electric quantity thereof, a primary relay for controlling the regulator means, the relay comprising a magnetic core structure, a plurality of windings disposed thereon, and a disk disposed for movement when the windings are energized to produce a torque thereon for controlling the regulator means, one of the windings being supplied with electric energy at a voltage that is a measure of the voltage of the electric circuit, a reactor connected in circuit with said one of the windings for compensating for the phase angle of the impedance of the electric circuit, said reactor having an impedance large with respect to the impedance of said winding whereby the current in said winding is substantially constant for changes in ambient temperature, another of the windings being supplied with electric energy at a current value that is a measure of the current in the electric circuit, and compensating means connected in circuit with said another of the windings for compensating for the magnitude of the impedance of the electric circuit independently of the phase angle of said line impedance.

3. In combination, an electric circuit having a line impedance, regulator means connected to said circuit for varying an electric quantity thereof, a primary relay for controlling the regulator means, the relay comprising a magnetic core structure, a plurality of windings disposed thereon, and a disk disposed for movement when the windings are energized to produce a torque thereon for controlling the regulator means, one of the windings being supplied with electric energy at a voltage that is a measure of the voltage of the electric circuit, compensating means connected in circuit with said one of the windings for compensating for the phase angle of the impedance of the electric circuit, said compensating means maintaining the current in said one of the windings substantially constant for changes in ambient temperature, another of the windings being supplied with electric energy at a current value that is a measure of the current in the electric circuit, a resistor connected in circuit with said another of the windings for compensating for the impedance of the electric circuit independently of the phase angle of said impedance, and means for adjusting the resistor to vary the compensation in accordance with the magnitude of the impedance of the electric circuit.

4. In combination, an electric circuit having a line impedance, regulator means connected to said circuit for varying an electric quantity thereof, a primary relay for controlling the regulator means, the relay comprising a magnetic core structure, a plurality of windings disposed thereon, and a disk disposed for movement when the windings are energized to produce a torque thereon for controlling the regulator means, one of the windings being supplied with electric energy at a voltage that is a measure of the voltage of the electric circuit, a reactor connected in circuit with said one of the windings for compensating for the phase angle of the impedance of the electric circuit, said reactor having an impedance large with respect to the impedance of said winding whereby the current in said winding is substantially constant for changes in ambient temperature, another of the windings being supplied with electric energy at a current value that is a measure of the current in the electric circuit, a resistor connected in circuit with said another of the windings for compensating for the impedance of the electric circuit independently of the phase angle of said impedance, and means for adjusting the resistor to vary the compensation in accordance with the magnitude of the impedance of the electric circuit.

5. In a regulating system, an electric circuit having a line impedance, regulator means connected to said circuit for varying an electric quantity thereof, a primary relay for controlling the regulator means, the relay comprising a magnetic core structure, a plurality of windings disposed thereon, and a disk disposed for movement when the windings are energized to produce a torque thereon for controlling the regulator means, one of the windings being connected across the electric circuit and responsive to the voltage thereof to produce a torque on the disk, a reactor connected in series circuit relation with said one of the windings for maintaining the current in the winding substantially constant for changes in ambient temperature, the reactor also compensating for the phase angle of the impedance of the electric circuit, another of the windings being connected to the electric circuit and responsive to the current thereof to produce a torque on the disk in opposition to the torque produced by said one of the windings, and a resistor connected in circuit with said another winding to control the energizing current therein independently of the phase angle of the impedance of the electric circuit, said resistor being adjustable for compensating for variations in the magnitude of the impedance of the electric circuit, the windings thereby cooperating to produce a resultant torque on the disk which is compensated for the impedance and the phase angle of the impedance of the electric circuit to control the regulator means to vary an electric quantity of the electric circuit.

HERBERT J. CARLIN.
RUTH M. CRICHTON.
*Administratrix of the estate of Leslie N. Crichton, deceased.*